United States Patent
Mayhew et al.

(10) Patent No.: US 8,531,968 B2
(45) Date of Patent: Sep. 10, 2013

(54) LOW COST IMPLEMENTATION FOR A DEVICE UTILIZING LOOK AHEAD CONGESTION MANAGEMENT

(75) Inventors: David Mayhew, Northborogh, MA (US); Karl Meier, Wellesley, MA (US); Nathan Dohm, Natick, MA (US)

(73) Assignee: Jinsalas Solutions, LLC, Dover, DE (US)

( * ) Notice: Subject to any disclaimer, the term of this patent is extended or adjusted under 35 U.S.C. 154(b) by 320 days.

(21) Appl. No.: 12/872,795

(22) Filed: Aug. 31, 2010

(65) Prior Publication Data

US 2011/0044175 A1    Feb. 24, 2011

Related U.S. Application Data

(62) Division of application No. 10/794,067, filed on Mar. 5, 2004, now Pat. No. 7,809,007.

(51) Int. Cl.
  *G01R 31/08* (2006.01)
  *H04L 12/28* (2006.01)

(52) U.S. Cl.
  USPC ........................................ 370/238; 370/395.2

(58) Field of Classification Search
  USPC .............................................. 370/238, 395.2
  See application file for complete search history.

(56) References Cited

U.S. PATENT DOCUMENTS

| | | | |
|---|---|---|---|
| 5,313,454 A | 5/1994 | Bustini et al. |
| 5,841,773 A | 11/1998 | Jones |
| 5,970,048 A | 10/1999 | Pajuvirta et al. |
| 5,987,008 A | 11/1999 | Simpson et al. |
| 6,031,821 A | 2/2000 | Kalkunte et al. |
| 6,115,356 A | 9/2000 | Kalkunte et al. |
| 6,201,810 B1 | 3/2001 | Masuda et al. |
| 6,363,052 B1 | 3/2002 | Hosein |
| 6,424,627 B1 | 7/2002 | Sørhaug et al. |
| 6,570,848 B1 | 5/2003 | Loughran et al. |
| 6,636,512 B1 | 10/2003 | Lorrain et al. |
| 6,678,244 B1 | 1/2004 | Appanna et al. |
| 6,721,273 B1 | 4/2004 | Lyon |
| 6,985,500 B2 | 1/2006 | Ambiehl et al. |
| 6,996,658 B2 | 2/2006 | Brocco et al. |
| 7,023,857 B1 | 4/2006 | Chiussi et al. |
| 7,027,457 B1 | 4/2006 | Chiussi et al. |
| 7,035,212 B1 | 4/2006 | Mittal et al. |
| 7,062,581 B2 | 6/2006 | Brocco et al. |

(Continued)

OTHER PUBLICATIONS

Official Action in U.S. Appl. No. 10/794,067 issued Feb. 20, 2008, 33 pages.

(Continued)

*Primary Examiner* — Mark Rinehart
*Assistant Examiner* — Angel Brockman

(57) ABSTRACT

The invention utilizes a separate queue per output port as implemented in the traditional simple queuing schemes of the prior art. Further, it also uses the information found in the packet header to determine the output port and the next output port. Based on this information, it utilizes queues dedicated to congested flows, or "Congested Flow" queues. When the switch determines that, based on the first output port and the second subsequent output port, a packet in the output queue is destined for a congested path, it sets the offending packet aside in a Congested Flow queue, thereby allowing other packets destined for the first output port to continue to be transmitted. In this way, the HOL blocking issue is addressed, without the need for a significantly increased number of output queues.

20 Claims, 3 Drawing Sheets

(56) References Cited

U.S. PATENT DOCUMENTS

| | | | |
|---|---|---|---|
| 7,133,955 B2 | 11/2006 | Mayhew et al. | |
| 7,146,452 B2 | 12/2006 | Brocco et al. | |
| 7,155,557 B2 | 12/2006 | Meier | |
| 7,212,534 B2* | 5/2007 | Kadambi et al. | 370/395.2 |
| 7,215,639 B2 | 5/2007 | De Maria et al. | |
| 7,286,552 B1 | 10/2007 | Gupta et al. | |
| 7,443,869 B2 | 10/2008 | Solomon et al. | |
| 7,451,282 B2 | 11/2008 | Meier et al. | |
| 7,518,996 B2 | 4/2009 | Mayhew et al. | |
| 7,573,827 B2 | 8/2009 | Santos et al. | |
| 7,894,343 B2* | 2/2011 | Chao et al. | 370/235 |
| 2002/0089934 A1 | 7/2002 | Sokhin et al. | |
| 2002/0118641 A1 | 8/2002 | Kobayashi | |
| 2002/0122410 A1 | 9/2002 | Kulikov et al. | |
| 2002/0145982 A1 | 10/2002 | Talpade et al. | |
| 2003/0115355 A1 | 6/2003 | Cometto et al. | |
| 2004/0015561 A1 | 1/2004 | Mayhew et al. | |
| 2004/0042402 A1 | 3/2004 | Galand et al. | |
| 2004/0109412 A1 | 6/2004 | Hansson et al. | |
| 2004/0128410 A1 | 7/2004 | Mayhew et al. | |
| 2004/0257995 A1* | 12/2004 | Sandy et al. | 370/235 |
| 2005/0080976 A1 | 4/2005 | Brocco et al. | |
| 2005/0141429 A1 | 6/2005 | Jayakrishnan et al. | |
| 2005/0195845 A1* | 9/2005 | Mayhew et al. | 370/412 |
| 2005/0270974 A1 | 12/2005 | Mayhew | |
| 2006/0050691 A1 | 3/2006 | Meier | |
| 2006/0104275 A1 | 5/2006 | Dohm | |
| 2007/0071005 A1 | 3/2007 | Mayhew et al. | |

OTHER PUBLICATIONS

Response to Official Action in U.S. Appl. No. 10/794,067 issued Feb. 20, 2008, filed May 6, 2008, 27 pages.
Official Action in U.S. Appl. No. 10/794,067 issued Aug. 5, 2008, 38 pages.
Response to Official Action in U.S. Appl. No. 10/794,067 issued Aug. 5, 2008, filed Feb. 4, 2009, 21 pages.
Official Action in U.S. Appl. No. 10/794,067 issued Apr. 27, 2009, 25 pages.
Response to Official Action in U.S. Appl. No. 10/794,067 issued Apr. 27, 2009, filed Jul. 27, 2009, 17 pages.
Restriction Requirement in U.S. Appl. No. 10/794,067 issued Nov. 25, 2009, 9 pages.
Response to Restriction Requirement in U.S. Appl. No. 10/794,067 issued Nov. 25, 2009, filed Dec. 28, 2009, 17 pages.
Rule 312 Amendment in U.S. Appl. No. 10/794,067, filed Jul. 6, 2010, 10 pages.
Response to Rule 312 Amendment in U.S. Appl. No. 10/794,067, filed Jul. 6, 2010, issued Aug. 20, 2010, 2 pages.

\* cited by examiner

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| \multicolumn{4}{|c|}{S3 Output Port} | \multicolumn{4}{c|}{S2 Output Port} | \multicolumn{4}{c|}{S1 Output Port} | \multicolumn{4}{c|}{S0 Output Port} |
| \multicolumn{16}{|c|}{Other Packet Fields} |
| \multicolumn{16}{|c|}{Other Packet Fields} |
| \multicolumn{16}{|c|}{Other Packet Fields} |

LOW COST IMPLEMENTATION FOR A DEVICE UTILIZING LOOK AHEAD CONGESTION MANAGEMENT

This application is a divisional of and incorporates by reference in its entirety U.S. patent application Ser. No. 10/794,067, filed Mar. 5, 2004.

BACKGROUND OF THE INVENTION

In computer networks, information is constantly being moved from a source to a destination, typically in the form of packets. In the simplest situations, the source and destination are directly connected and the packet of information passes from the source to the destination, without any intermediate stages. However, in most networks, there are at least one, if not multiple, intermediate stages between the source and the destination. In order for the information to move from the source to the destination, it must be routed through a set of devices that accept the packet and pass it along a predetermined path toward the destination. These devices, referred to generically as switches, are typically configured to accept packets from some number of input ports and transmit that information to an output port, which was selected from a plurality of ports. Often, ports are capable of both receiving and transmitting, such that the input and output ports are the same physical entities.

In an ideal network, traffic arrives at an input port of a switch. The switch determines the appropriate destination for the packet and immediately transmits it to the correct output port. In such a network, there is no need for storing the packet of information inside the switch, since the switch is able to transmit the packet as soon as it receives it.

However, because of a number of factors, this ideal behavior is not realizable. For instance, if the switch receives packets on several of its input ports destined for the same output port, the switch must store the information internally, since it cannot transmit all of these different packets of information simultaneously to the same output port. Similarly, an output port may become "congested". This term describes the situation in which the device to which this output port is connected is unable to receive additional information for some reason. In such a case, the switch must store the packet destined for that output port internally until either the offending device is able to receive more information or the packet is discarded.

This need to store information within a switch requires that memory, or buffers, exist within the device to store the packet until it can be delivered. In order to organize this buffer space, queues are created. Queues are memory structures that implement a first in, first out protocol for the transmission of packets. In one implementation, each output port has an associated queue. When the switch receives information on an input port, it determines the destination and moves it to the appropriate output port queue. If the output port is not busy, then the information will be transmitted immediately. If the output port is congested, then the information will be placed at the end of the queue, and will have to wait its turn before being transmitted. Typically, the preferred objective is to transmit the information of a particular traffic class in the order in which it was received.

It is not necessary that a queue be associated with each output port. For example, a queue can be associated with each input port, such that information is immediately placed into a queue upon arrival. Later, the information is removed from the queue and transferred to the appropriate output port when that port is available.

However, these schemes suffer from a phenomenon known as Head-Of-Line (HOL) blocking. This refers to the situation where a queue continues to be filled with new packets of information, but is unable to transmit any information because the packet at the head of the list cannot be transmitted at the present time. Since queues function using a first in, first out priority, no other information can be sent until the packet at the head of the queue has been transmitted. For example, suppose that there are five packets in a queue for transmission, each destined for a different output port. Due to a situation downstream, output port 3 is unable to send at this time. Once the packet that is destined for output port 3 reaches the head of the queue, all progress stops until output port is no longer congested. Therefore, a packet contained further down in the queue, which could have been sent on its associated output port, is blocked by the congestion on output port 3.

To help alleviate this problem, the input port can be configured with a queue for each output port. For example, if there are 16 output ports, each input port would have 16 queues associated with it; one per output queue. Such an arrangement reduces the HOL blocking issue described above, by adding additional storage at each input port. In this manner, information destined for output port 2 would not be blocked by congestion at output port 3. While this scheme reduces the issue of HOL blocking as compared to the previous scheme, the issue is not eliminated by this scheme, as described later.

While the information destined for a specific output port can be transmitted without reliance on the status of other output ports, there are still situations where HOL blocking occurs. In many cases, the output port of a switch is not connected to the final destination, but rather to another switch of similar or identical structure and behavior as the current switch. Thus, packets transmitted via output port 3 may arrive at a second switch, which then must repeat the process of determining the next destination. Suppose that output port 7 of this second switch is congested. Once this occurs, the second switch will no longer be able to accept additional information that is destined for its output port 7. Referring back to the first switch, the first switch maintains a queue for information destined for its output port 3 (i.e. the second switch). Once a packet destined for output port 7 of the second switch appears at the head of its queue for output port 3, the queue will become blocked because the second switch cannot accept any traffic destined for this port. Consequently, all other traffic destined for the second switch is blocked until output port 7 of the second switch has been cleared of its congestion. Thus, traffic destined for all other output ports on the second switch are unnecessarily blocked because of an isolated issue on one output port of the second switch.

HOL blocking is a serious concern in the development of networks. HOL blocking can reduce the overall used bandwidth by as much as 44%. Therefore, a solution is needed to further reduce the problem described above.

In some networks, a switch only has the ability to understand and determine which output port it should transmit a packet to; it has no ability to determine the path of the packet once it leaves that output port. However, some networks are designed so that the entire path of the packet is contained within the packet information, typically within a control header. In these cases, a switch is able to determine its actions for a particular packet of information, and is also able to determine what actions downstream switches will take.

Using this information, it is possible that a switch can further reduce the issue of HOL blocking. Previously, the queues were established to correspond to the output ports of the current switch. By increasing the number of queues to correspond to not only the output port of this switch, but also the output port of the next switch, the HOL blocking issue described above is alleviated. While this scheme significantly reduces the HOL blocking issue by looking at both the current output port and the next output port, it is very complex to implement.

If each switch has 16 potential output ports, then the number of queues associated with each input port grows from 16 in the scenario earlier described to 256. This number is determined by looking at each output queue and realizing that each output port has 16 potential next output ports. Therefore, there is a non-linear increase in the amount of queues that must be used to implement this improved scheme. In another example, if each switch has 32 output ports, then the number of queues per input port grows from 32, to 32*32 or 1024.

While the HOL issue is significantly reduced, the amount of queues and buffering that must be added to a switch to implement this scheme becomes prohibitive.

Therefore, it is an object of the present invention to provide a switch that offers the advantages of the improved scheme above, but does not require the high number of queues and buffers needed to implement it.

SUMMARY OF THE INVENTION

The problems with the prior art have been overcome with this invention, which maintains the low occurrence of HOL blocking found in the advanced queuing scheme of the prior art, but achieves this result using a fraction of the queues and buffers needed by the prior art. Briefly, the invention utilizes a separate queue per output port as implemented in the simple queuing scheme of the prior art. Further, it also uses the information found in the packet header to determine the output port and the next output port, in a similar manner as presented in the improved queuing scheme described above. However, instead of creating separate queues for each of these combinations, it utilizes queues dedicated to congested flows, or "Congested Flow" queues. When the switch determines that, based on the first output port and the second subsequent output port, a packet is destined for a congested path, it sets the offending packet aside in a Congested Flow queue, thereby allowing other packets destined for the first output port to continue to be transmitted. In this way, the HOL blocking issue is addressed, without the need for the increased number of output queues described in the advanced scheme. In fact, depending on the specific implementation, the reduction in the occurrence of HOL blocking can be equal to that of the aforementioned improved queuing scheme, while the number of queues remains roughly equivalent to those needed for the simpler queuing scheme.

DETAILED DESCRIPTION OF THE INVENTION

Figure 1:
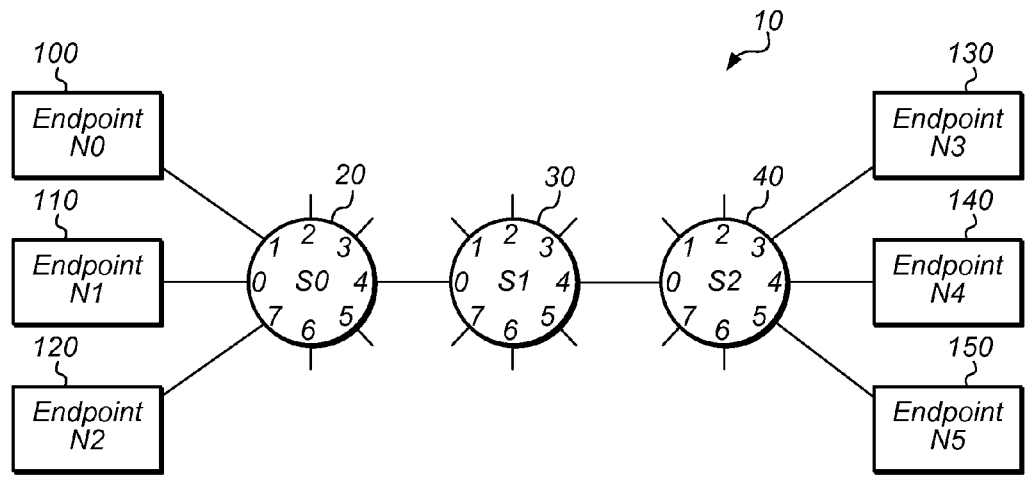
FIG. 1 illustrates a typical network and network fabric topology, containing several intermediate stages between the source and the destination.

Within computer networks, systems, also known as fabrics, are designed that allow multiple nodes, or endpoints to communicate with one another. FIG. 1 illustrates a configuration used in the creation of such a fabric. Fabric 10 is comprised of a number of devices, or nodes, that are interconnected to one another. These devices, broadly known as switches, are capable of receiving packets of information via a plurality of input ports and then transmitting these packets via a plurality of output ports, preferably via an output port that is different than the input port. When a number of these are connected together, it is possible to create a fabric whereby multiple endpoints are able to communicate with each other via the various paths that are established by the switches. Within fabric 10, three switches, 20, 30 and are shown. Most fabrics are more complex than this example, with additional switches connected to the unused outputs of switches 20,30, and 40. There is no theoretical maximum on the total number of switches, the number of switches between the endpoints, or the configuration of the fabric and this invention is capable of working in any configuration. Within a fabric, the ports of each switch are connected in a point-to-point fashion with ports from other switches. A port on one switch is connected to a single port on another switch, via a point-to-point interconnection, preferably via a cable or wires. Two switches that share an interconnection such that one port of the first switch is in direct communication with one port of the second switch via the shared interconnection are said to be adjacent to one another. In FIG. 1, switch 30 is adjacent to both switch 20 and switch 40. Similarly, switch 20 is adjacent to switch 30 and endpoints 100, 110 and 120. Specifically, port 4 of switch 20 is in direct communication with port 0 of adjacent switch 30. Even though physical elements such as cables, filters, back planes, EMI control logic or other devices may exist between port 4 of switch 20 and port 0 of switch 30, these two ports are defined to be adjacent and in direct communication since there are no other switches in the direct path between these two ports.

Attached to switch 20 via point-to-point connections are endpoints 100, 110 and 120. These endpoints may be computing devices, such as personal computers or servers. They may also be other networking devices, such as, but not limited to, routers, wiring closet switches, or gateways. Attached to switch 40 via point-to-point connections are endpoints 130, 140 and 150, which may also be any of the categories previously described. The number of switches and endpoints in this figure is solely for illustrative purposes and the invention is not to be limited by the number of either. Using fabric 10, any endpoint in FIG. 1 can communicate to any other endpoint. In some cases, this is accomplished by using only a small part of the fabric. This is the case when endpoint 100 communicates with endpoint 120. Only switch 20 is involved in transferring packets between these endpoints. In other situations, many more switches are involved in the communications between two endpoints, such as is the case between endpoint 100 and endpoint 150. In this case, endpoint 100 communicates to switch 20, which forwards the packet to switch 30, which in turn forwards it to switch 40, which forwards the packet to its ultimate destination, endpoint 150.

Figures 5, 6:
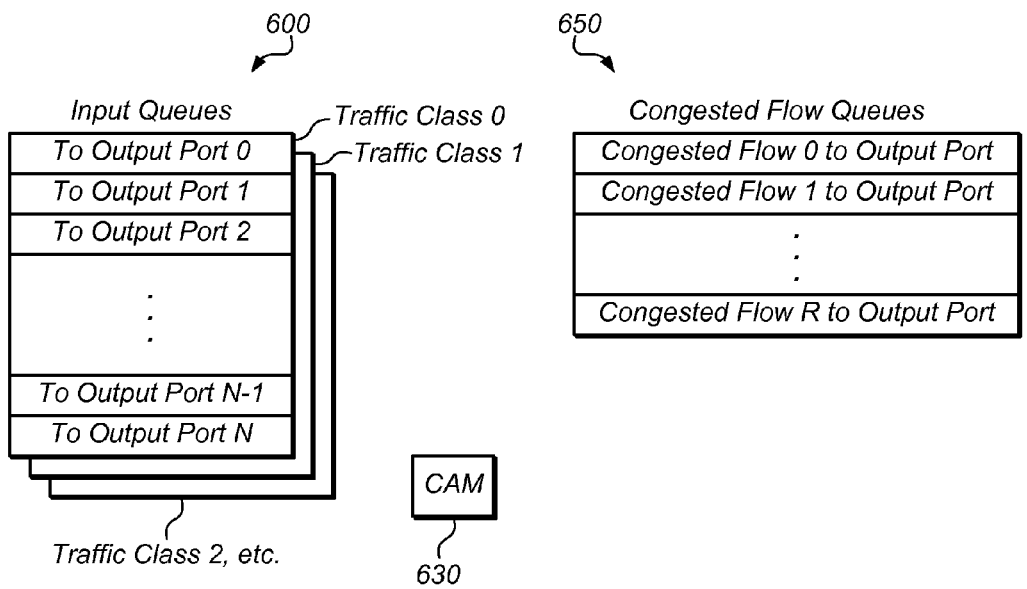
FIG. 5 illustrated an exemplary packet header showing the path that the packet will take through the network or fabric.
FIG. 6 illustrates a second embodiment of the present invention.

When a packet is received by switch 20, it examines that packet to determine which output port it should transmit the packet to. There are multiple methods whereby switch 20 can determine the correct output port, based on the routing policies used in the fabric. For example, destination address based routing allows the switch to select the output port based on the ultimate destination of the packet. The switch may contain an internal table that associates each destination address with an output port. When switch 20 receives a packet, it determines the destination address of the packet, indexes into its table and selects the appropriate output port. Path based routing is an alternative method of routing packets through a fabric. In this scenario, the packet header contains the path that the packet is to follow. One example of path based routing is illustrated in FIG. 5, where the header of a packet is shown. Embedded in the header is the path that the packet should take. In this simple example, the path is divided into 4 bit fields. Each of these 4 bit fields corresponds to the output port that should be used by a specific switch. For example, switch 20 would look at bits <3:0> to determine which output port it should transmit on; then switch 30 would look at bits <7:4> to determine its output port and finally switch 40 would look at bits <11:8> to determine its output port. Referring back to FIG. 1, if the packet contained the string 344, the packet would be transmitted via output port 4 of switch 20, output port 4 of switch 30 and output port 3 of switch 40. Therefore, this string defines the path to endpoint 130. There are numerous variations of this simple approach to path based routing. For example, rather than specifying the output port of a switch, the packet may specify the relative position of the output port as compared to the input port. In this scenario, bits <3:0> would specify the number of turns in a clockwise direction that exist between the input port and the output port. A path originating at Endpoint 120 would set bits <3:0> to 0, if it wished the packet to be routed to endpoint 110, since there are no turns in a clockwise direction between these two ports. To send a packet to endpoint 130, endpoint 120 would set bits <3:0> to 4 to direct the packet to switch 30. Continuing on, it would set bits <7:4> to 3 to direct the packet to switch 40, and finally it would set bits <11:8> to 2 to direct the packet to its ultimate destination, endpoint 130. This description of path based routing is only meant to illustrate the principles defining the protocol.

This description is in no way meant to limit the current invention to this, or any particular implementation of path based routing. While the current embodiment of this invention is intended for use with a path based routing protocol, it is not so limited. The current invention will operate with any protocol in which a switch has knowledge of not only its required action, but that of the next downstream switch. For example, the device may implement a table containing the destination address for each endpoint, and the complete path used by the fabric to reach that endpoint.

Figure 2:
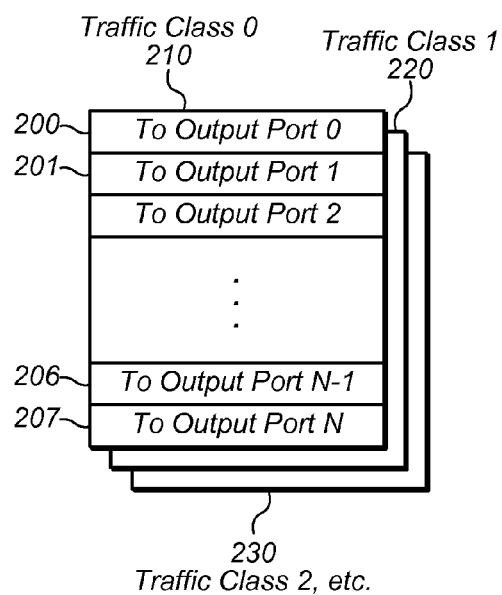
FIG. 2 illustrates the input queue structure using a simple queuing method with severe head-of-line blocking.

Referring again to FIG. 1, each switch implements an internal queuing system that allows it to store packets as they are received, before the switch has transmitted them. In one embodiment, queues are created and associated with each input port. That is, there is a set of queues located at each input port. Within that set is a queue associated with each output port. For example, input port 0 of switch would have a set of 8 queues, one for each possible output port. In this manner, as a packet arrives, the switch quickly determines the required output port and places it in the queue associated with that output port. FIG. 2 shows the structure of the simple input queues. Queue 200 is the buffer space where traffic destined for output port 0 is stored until transmission. Similarly, queue 201 is the buffer space where traffic destined for output port 1 is stored. The switch will typically contain as many queues as it contains output ports. Therefore, if FIG. 2 represents the input queue structure for switch 20, there would be 8 queues at each input port.

Typically, within a network or network fabric system, there may be different classes of traffic. For example, video traffic is deemed to be very time critical, as any delay in its transmission will result in lost frames and a distorted image. Therefore, the system, by the utilization of distinct traffic classes, can guarantee that video traffic will receive a guaranteed amount of bandwidth. Similarly, voice contains time critical information, although perhaps slightly less time critical than video. Traffic classes can also be used to support isochronous traffic, whereby the class gets a fixed allocation of bandwidth at regular time intervals. Other types of data, such as status information, may be delivered on a best effort basis, where this is typically the lowest class. The classification of traffic provides a mechanism for the network to automatically prioritize packets as they are transferred through the network. In many traditional systems, traffic classes define specific quality of service parameters, such as latency through the network. Networks achieve the required quality of service parameters by applying weights to each class of traffic. For example, a packet of the highest traffic class destined for a specific output port may be allowed to move ahead of all other packets waiting to be transmitted via that output port. Often this mechanism is implemented through multiple queues per output port, where each queue is allocated a specific percentage of the total bandwidth for that output port.

Traffic classifications are also necessary in network fabrics to eliminate the possibility of deadlock, or heavy congestion. By assigning network administration and status messages a high traffic class, they can bypass other information. Using this mechanism, a message notifying an upstream device about congestion can be sent immediately, allowing the device to modify its delivery profile.

Referring back to FIG. 2, the simple queue structure shown can be augmented by adding the additional dimension of traffic class. The queues that are visible, 200 through 207, define the traffic class 0 queue set 210, which store the packets destined for each output port at traffic class 0. Set 220 is an identical set of queues for packets with traffic class 1 and Set 230 is associated with traffic class 2. There can be as many traffic classes as are necessary to achieve the required network performance. For example, more than 20 different traffic classes are defined for some network fabric protocols to maximize throughput and minimize latency.

Referring to FIG. 2, it can be seen that the total number of queues associated with each input port can be expressed as:

OP*TC, where OP is the number of output ports and TC is the number of traffic classes.

Furthermore, the number of queues required within the entire switch can be expressed as:

IP*OP*TC, where IP is the number of input ports.

Therefore, in a switch having 16 ports (each being both input and output) and 4 traffic classes, there would be a total of 1024 queues, calculated as 16*16*4.

Despite this seemingly large number of queues, there are significant performance issues associated with this implementation. Referring to FIG. 1, let it be assumed that endpoint 130 is congested, such that it is unable to accept any additional packets from switch 40. Typically, there is a mechanism, known as flow control, within the network to allow the destination to inform the source that it is unable to accept additional packets.

There are a number of different congestion flow mechanisms that are known in the art. One technique is known as Status Based Flow Control, where a downstream node explicitly informs an upstream node which of its output ports are congested. This can be accomplished in the form of a message telling the sender to stop transmitting, followed by a second message telling it to resume when the congestion is resolved. Alternatively, the destination might transmit a message telling the source to stop transmitting packets for a specific time period.

A second method is known as packet marking or explicit congestion notification (ECN). In this scenario, packets that arrive at the node by way of a congested path, are identified by a special marker in the packet. The node, upon detecting this mark, is now aware that any packets that it sends back in that direction are likely to encounter congestion.

A third method uses a credit mechanism, whereby the sender has a specific number of credits, which allow it to transmit via its output port. When the device sends a packet, its credit count is decremented. When the destination receives and forwards the packet on, it replenishes the credit, thereby allowing the sender to transmit more packets. This mechanism insures that there is space at the receiving node to store the incoming packet.

The specific implementation of flow control is not critical to the invention, only that some form does exist. Returning to the example using FIG. 1, endpoint 130 sends a flow control message to switch 40 telling it to stop sending it packets. Over time, switch 40 will no longer be able to store any additional packets destined for endpoint 130, and will in turn tell switch 30 to stop sending packets destined for endpoint 130.

However, in the simple queue structure of FIG. 2, queues are not established based on final destinations, or even based on what the next switch will do. Therefore, once a packet that is ultimately destined for endpoint 130 reaches the head of the queue of output port 4, the queue must stop. Since endpoint 130 is congested, no additional packets are allowed to leave switch 30 destined for this node. However, suppose that the next packet in the queue is ultimately destined for endpoint 150. This packet is effectively blocked from being transmitted because of the offending packet at the head of the queue. In other words, traffic that is intended for endpoint 140 and endpoint 150 will be prevented from being transmitted because of congestion in endpoint 130. This is a classic example of head-of-line (HOL) blocking, which severely impacts the overall performance of a network.

While the previous example assumes that the endpoint is congested, the invention is not so limited. Often in complex fabrics, with high numbers of switches, transient congestion will develop within one of the switches. The congestion issues, and HOL blocking that results from it, would be identical in this situation.

There are methods that can be used to alleviate this HOL blocking issue. For example, in networks that implement path based routing, or any network that allows a device to have visibility to the downstream actions of the packet, improvements to the queuing structure can be made.

In path-based routing, switch 20 can determine the output port that it should use, as well as the output ports of the subsequent switches in the path. By using this knowledge, it is possible to better pinpoint and isolate a congested flow from all others.

Figure 3:
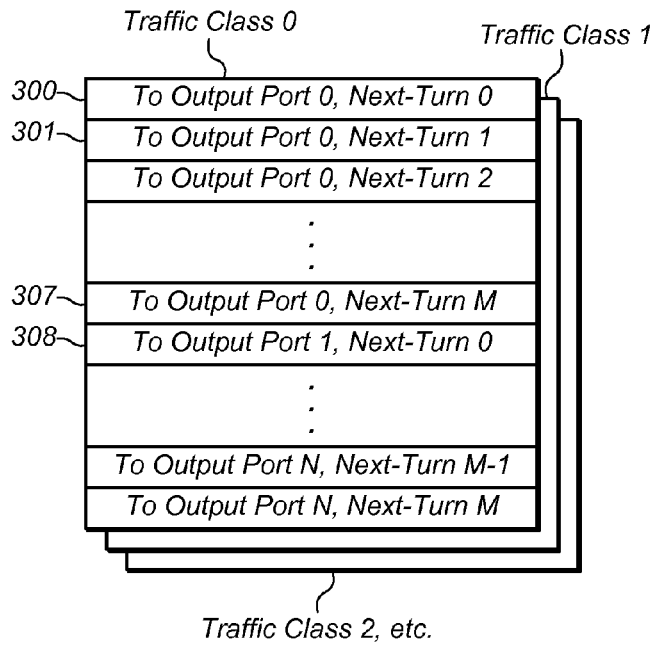
FIG. 3 illustrates the input queue structure using an advanced queuing method with improved head-of-line blocking characteristics.

FIG. 3 shows a prior art improvement on the simple queue structure illustrated in FIG. 2. This structure creates individual queues based on both the output port of this switch and the output port of the next switch. Queue 300 stores those packets that will be transmitted via output port 0 of this switch and output port 0 of the next sequential switch (referred to hereafter as Next Turn). Similarly, queue 301 stores those packets that will also be transmitted via output port 0 of this switch, but will then be transmitted via next turn 1. Queue 307 contains the packets destined for output port 0 of this switch and the highest numbered port of the next sequential switch. Logic within the switch will schedule queues 300-307 to all be transmitted via output port 0.

Queue 308 then stores all packets destined for output port 1 of this switch and next turn 0. This structure continues for every combination of output port and next turn.

Returning to the example of congestion in endpoint 130, the improved structure of FIG. 3 eliminates this scenario. In this case, once congestion has been detected at endpoint 130, switch 30 would stop transmitting packets contained in the queue destined for output port 4, next turn 3. Packets for endpoint 150, which are stored in the queue designated as output port 4, next turn 5, are completely unaffected by the congestion at endpoint 130. While this queuing structure significantly improves the HOL blocking characteristics of the network, it is not without its serious drawbacks.

The number of queues at each input port with this improved structure can be expressed as:

OP*NT*TC, where NT is the number of output ports in the next sequential device, OP is the number of output ports and TC is the number of traffic classes.

Assuming that there are 4 traffic classes and that the next sequential device also has 16 output ports, the number of queues has increased to 1024 per input port, or a total of over 16,000 queues for a 16-port switch.

The example above assumes that there are only 16 output ports in the next sequential switch. While this may be true, the switches may have maximum port counts that are much higher, such as 128 or even larger. Implementing a queue structure allowing for a value of NT of 128 significantly increases the number of queues to over 128,000 for a single switch.

Faced with this problem, designs may assume a more reasonable number for NT, and adapt if their assumption is incorrect. A device may assume a total of 16 output ports on the next sequential device. If the actual NT is greater than that, queues will become shared. In one embodiment, the switch will simply use the following formula:

Queue's NT=actual NT modulo 16

In this way, traffic destined for next turn 0, 16, 32, etc. will all be stored in the queue for NT 0. Similarly, NT 1, NT 17, NT 33, etc will share the queue for NT 1. This technique is known as aliasing. While it allows the number of queues to be reduced somewhat, it reintroduces the HOL blocking issue, since multiple streams again share the same queue. Therefore, the optimal choice for NT is difficult, as the system designer must balance HOL blocking against the complexity of implementation, as measured by the total number of queues.

The complex queue structure of FIG. 3 has additional drawbacks, besides the complexity of implementation. As previously stated, there are now multiple queues that transmit to a single output port, which are scheduled by control logic resident in the switch. There are multiple scheduling algorithms that can be used to determine which queue is allowed to transmit to the output port. Weighted Round Robin (WRR) is a common algorithm that is used, although there are others known in the art. In this scheme, all queues are allowed to send their packets using a modified round robin scheme, where higher traffic classes are allocated a larger percentage of the overall bandwidth. This technique results in the delivery of all packets, but has drawbacks associated with that delivery.

A queue with many packets will potentially be penalized as compared to a sparsely populated queue. As an example, suppose five packets arrive that are all destined for queue (0,0), where (0,0) represents the ordered pair of output port and next turn, and then a sixth packet arrives, destined for queue (0,1). As the packets arrive, they are placed in the appropriate queues, and the scheduler prioritizes each queue's access to output port 0, since all of these packets are destined for output port 0. It is possible, using WRR or other scheduling techniques known in the art, that the sixth packet that arrived last at the switch will be transmitted before some of those that arrived before it. This is due to the fact that this sixth packet is actually at the head of its queue, while the other queue has five packets in it. This situation leads to out-of-order delivery and results in wider variations in the latency through the switch, a characteristic that is undesirable in a network.

Until now, system designers have been forced to balance parameters, such as latency, HOL blocking performance, and implementation complexity, in an effort to achieve an optimal operating point for the system. The current invention allows the designer to create a system with very limited HOL blocking, and reduced variation in latency, all while requiring a number of queues only slightly greater than the simple queue structure of FIG. 2.

The current invention incorporates the simple queue structure from FIG. 2. However, it then uses information regarding the traffic patterns downstream to eliminate the HOL blocking issues associated with that implementation.

Figure 4:
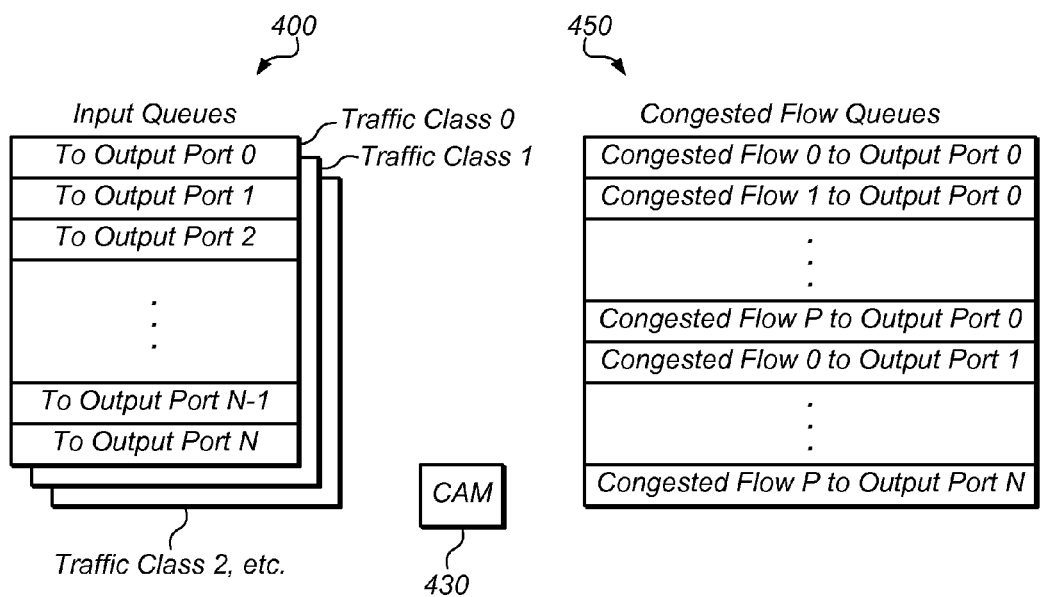
FIG. 4 illustrates the input queue structure of the present invention.

FIG. 4 illustrates an exemplary queue structure for the current invention. Input queues 400 correspond to the input queues found in FIG. 2. As was the case in FIG. 2, the number of output queues can be expressed as:

OP*TC, where OP is the number of output ports and TC is the number of traffic classes To this is added a set of dynamically assigned queues, known as Congested Flow (CF) queues 450. Unlike the input queues 400 which are statically assigned to a specific port, the assignment of the CF queues varies, according to the needs of the system. A content addressable memory (CAM) 430 is used to store the assignments for the CF queues. The number of CF queues is a system implementation detail, and is in no way limited or fixed by this disclosure. In one embodiment, a set of CF queues can be associated with each output port. In other words, a number of CF queues would be reserved for use with flows to output port 0; while a different set of CF queues would be associated with output port 1. In a second embodiment, a set of CF queues can be shared among all of the input queues 400 of a given input port.

Packets arrive and are placed in the appropriate queues, as was described in reference to FIG. 2. Returning to the example in which endpoint 130 was congested, switch 40 sends a message, known as a status based flow control message, to switch 30. This message contains the traffic class and output port of switch 40 that is encountering the congestion, namely port 3. Switch 30, upon receiving this message, stores the traffic class, the output port (4), and the NT (3) in the CAM. As packets get to the head of the list for a given (OP,TC), the NT is compared against the entries in the CAM corresponding to that output port. If the NT of the packet at the head of the list is not found in the CAM, the packet is transmitted normally. However, if the NT of the packet at the head of the list matches an entry in the CAM, this packet is moved off the queue and into one of CF queues. The processing of the output list continues as before, with the blocked packet residing in a CF queue, rather than sitting atop the output queue, blocking other traffic.

Once a congested flow has been identified, a CF queue will be temporarily assigned to it, and its parameters will be stored in the CAM. Thereafter, packets destined for this congested flow are routed to that CF queue. At a later time, this flow will no longer be congested. The switch may determine this via a number of mechanisms, including, but not limited to: an explicit message from the downstream switch indicating that the congestion issue has been resolved, or using a timeout based on the amount of time that has passed since the switch was notified of the congestion problem. Once the switch has determined that the downstream flow is no longer congested, the CF queue associated with that flow is allowed to transmit to the output port. The scheduler can use a variety of mechanisms to determine the priority of the CF queue. In one embodiment, it is given the highest priority, and therefore, once free to send, it is granted control of the output port until it is empty. This method allows the CF queue to be recycled back into the free pool as quickly as possible, for potential use by another congested flow. Other embodiments include incorporating the CF queue into the normal WRR mechanism that it is being used. The specific method that the scheduler uses to empty the CF queue is an implementation decision and the invention is not limited to any particular means.

Since there are a plurality of CF queues, the switch is capable of receiving a plurality of status based flow control (SBFC) messages, and assigning other CF queues to additional congested ports. As described earlier, the number of congested ports that can be offloaded into CF queues is an implementation decision. A modest number of CF queues will result in HOL blocking performance that is equivalent to that of the complex queue structure of FIG. 3, but will require implementation complexity. Fewer CF queues are easier to implement and still significantly reduce the HOL blocking performance. However, depending on the number of CF queues implemented, this may not yield adequate HOL blocking performance. There are a limited number of flows that can see transient congestion, and this number is a function of the speed of transmission, the amount of internal switch buffering, and the timing of the congestion management messages. The optimal number of CF queues can be determined by the designer using queuing theory or simulation to yield the best balance between complexity and performance for the particular system. As long as the number of CF queues exceeds the maximum number of flows that can see transient congestion, this queuing structure will meet or exceed the performance of the advanced queue structure of FIG. 3.

As previously mentioned, the CF queues may be associated with a specific output port, as shown in FIG. 4, where P signifies the number of CF queues that each are available for each output port. Alternatively, the CF queues may be shared among all of the output ports, as shown in FIG. 6. In this case, separate queues 600 would be maintained for each output port and the CAM 630 would store the ordered triplet (OP, NT, TC), which denotes the output port, next turn and traffic class of the congested flow. By allocating a larger pool of queues 650 across all output ports, rather than a specific number for each one, better utilization of the queues, and therefore better performance can be realized. For example, output port 0 might be a heavily used port, with 9 congested flows, while port 1 may have no congested flows. By sharing CF queues across output ports, the nine congested flows on output port 0 can be accommodated simultaneously. Thus, by sharing CF queues across output ports, the same HOL performance is possible with fewer queues, or improved performance is possible with the same number of queues.

Comparing the implementation complexity, recall that the advanced queuing structure required OP*NT*TC queues per input port. In the case of 16-port switches with 4 classes of traffic, this totaled 1024 queues per input port, or over 16,000 total queues. In contrast, the present invention, as shown in FIG. 4 uses far less queues:

OP*TC+OP*CF, where CF represents the number of congested flow queues reserved for each output port.

Assuming that four CF queues per output port yields the desired HOL blocking performance, the number of queues per input port has been reduced to 128; a factor of 8 reduction in complexity. This reduces the total number of queues in the switch to 2048. Alternatively, the CF queues could be allocated across all of the output ports, rather than allocating 4 per output port. In this case, either improved performance can be achieved by retaining all 64 CF queues, or the number of total CF queues can be decreased to a smaller number to achieve the same performance.

In the implementation described above, packets are moved to the CF queues after they reach the head of the queue on which they were originally placed. While this is the preferred embodiment, the invention is not limited to only this method. As the packets arrive at the input port, rather than being routed to the corresponding output queue, the check for congestion can be done. In such a case, the TC, OP and NT of the packet are examined immediately, and if the combination is found in the CAM to be congested, then the packet is moved directly to the appropriate CF queue. While this is possible, it is less accurate than the preferred embodiment since the decision is being made earlier than necessary, and could result in packets being incorrectly placed in the wrong queue. In another embodiment, the parameters of the packet can be examined while the packet is in the output queue, but prior to it reaching the head of that queue.

While the description has been directed to a switch in which the queues are located near the input port, there are other embodiments that are also envisioned. For example, rather than having a set of queues associated with each input port, these queues could be associated with the output port. In that embodiment, as packets arrive at an input port, the switch would determine which output port they were destined for and place them in the appropriate queue at that output port. In this embodiment, all of the input ports would access a single set of queues located near each output port. Thus, there would be a total of TC queues associated with each output port, and therefore a total of TC*OP queues in the switch. To alleviate the HOL blocking issue described earlier, a set of CF queues and its associated CAM would be added at each output port. This increases the number of queues per output port to TC+CF, or a total number of switch queues of OP*TC+OP*CF. This value is to be contrasted with a total of OP*TC*NT, which would be required using the advanced queue structure of FIG. 3. Using values recited earlier, the present invention results in 128 total queues, while the alternative approach yields 1024 queues, again resulting in a factor of 8 reduction.

In a third embodiment, the queues are centrally located. In this scenario, like the output queue scenario, the input ports place packets destined for a specific output port in the single queue associated with that output port. In contrast to the output queue structure, however, the CAM and CF queues are not assigned per output port; rather they are shared among all of the output ports in the switch. Therefore, rather than having a CAM and a set of CF ports for each output port, one set is shared. This results in either fewer CF queues or in improved performance for the same number of CF queues, as was described in reference to the input queue structure earlier.

Other embodiments are possible, and these examples are not intended to limit the invention to only these embodiments. For example, rather than complete centralization, the switch may be partitioned such that there are a number (greater than 1, but less than OP) of pseudo-centralized queues. A predefined set of input ports would share one set of pseudo-centralized queues. The switch might be divided such that half of the input ports use one set of pseudo-centralized queues, while the other half uses a second set. Similarly, the switch could be divided into 4, 8 or some other number of partitions. These, and other queue structures are within the scope of the invention.

Similarly, while this invention uses the parameters of OP, TC and NT to identify congested flows, this does not exclude the use of other parameters. For example, some networks may assign virtual circuit numbers (VC's) or use other designations to identify paths through the fabric. These and other parameters are easily incorporated into the invention described above. Additionally, the invention can be easily expanded to use the CF queues to store packets intended for a specific path, not just a specific next turn. For example, the CAM may have the ability to store not just the OP and NT of a packet, but the OP and all NTs for the entire path of the packet. In this way, only packets that are destined to travel by way of a congested path will be retained. Meanwhile, packets that share a common NT with a congested path but are not themselves destined for that path will be allowed to be transmitted.

What is claimed:

1. A network device, comprising:
a memory including first and second groups of memory locations, wherein the device is configured to implement a primary queue in the first group of memory locations and a congestion queue in the second group of memory locations;
wherein the network device is configured to:
receive one or more packets to be transmitted by the network device and, in response, store the one or more packets in one or more memory locations of the primary queue implemented in the first group of memory locations;
receive information specifying that a particular output port of a downstream network device is congested; and
based at least in part on the information specifying that the particular output port of the downstream network device is congested and that a route for the one or more packets includes the particular output port of the downstream network device, transfer the one or more packets from within the primary queue implemented in the first group of memory locations to one or more memory locations of the congestion queue implemented in the second group of memory locations.

2. The network device of claim 1, wherein the one or more packets include information specifying that the one or more packets are to be transmitted by the network device via a first of a plurality of output ports of the network device, and wherein the one or more packets further include information usable to determine that the one or more packets are to be transmitted via the particular output port of the downstream network device;
wherein the first group of memory locations is for use by the network device to store packets to be transmitted via the first output port of the network device, but not packets to be transmitted via other ones of the plurality of output ports.

3. The network device of claim 2, wherein the network device is configured to:
   make a determination that the particular output port of the downstream network device is no longer congested; and
   transmit at least one packet in the congestion queue based at least in part on the determination.

4. The network device of claim 2, wherein a third group of memory locations is for use by the network device to store packets to be transmitted via the first output port of the network device, but not packets to be transmitted via other ones of the plurality of output ports; and
   wherein the first group of memory locations is for use by the network device to store packets having a first traffic class, and wherein the third group of memory locations is for use by the network device to store packets having a different traffic class.

5. The network device of claim 1,
   wherein the network device is configured to transfer the one or more packets to the second group of memory locations based, at least in part, on one of the one or more packets reaching a head of the primary queue.

6. The network device of claim 1, wherein the network device is configured to determine the route for the one or more packets based, at least in part, on information contained in one or more packet headers corresponding to the one or more packets.

7. A method, comprising:
   a first network device receiving a plurality of packets to be routed;
   the first network device storing the plurality of packets in a primary queue implemented in one or more memory locations of a first group of locations in a memory of the first network device; and
   the first network device transferring one or more of the plurality of packets from within the primary queue implemented by the first group of locations to one or more memory locations of a congestion queue implemented in a second group of locations in the memory of the first network device, wherein said transferring is based, at least in part, on an indication of congestion specifying congestion at a particular output port of a second network device and on information that indicates a route for the plurality of packets includes the particular output port of the second network device.

8. The method of claim 7, wherein the plurality of packets includes information specifying that the plurality of packets is to be transmitted by the first network device via a first of a plurality of output ports of the first network device, and wherein the one or more packets include information specifying that the one or more packets are to be transmitted via the particular output port of the second network device after arrival of the one or more packets at the second network device;
   wherein the first group of memory locations is for use by the first network device to store packets to be transmitted via the first output port of the first network device, but not packets to be transmitted via other ones of the plurality of output ports.

9. The method of claim 7, further comprising the first network device scheduling the one or more packets for transmission to the second network device based, at least in part, on a determination that the particular output port of the second network device is no longer congested.

10. The method of claim 9, further comprising the first network device receiving from the second network device information usable to determine that the particular output port of the second network device is no longer congested.

11. The method of claim 7,
   wherein said transferring the one or more packets is based, at least in part, upon the one or more packets reaching a head of the primary queue.

12. The method of claim 7, wherein said transferring the one or more of the plurality of packets is based, at least in part, on a traffic class corresponding to the one or more packets.

13. A device, comprising:
   a memory system, including:
      a primary queue implemented by a first group of memory locations; and
      a congestion queue implemented by a second group of memory locations;
   wherein the device is configured to:
      receive an indication of congestion specifying congestion at a particular output port of a downstream network device;
      receive a group of one or more packets;
      store the received group of one or more packets in the primary queue; and
      based at least in part on the received indication of congestion and on information indicating a path associated with the group of one or more packets includes the particular output port of the downstream network device, transfer the group of one or more packets from the primary queue to the congestion queue.

14. The device of claim 13, wherein the memory system further comprises:
   a congestion queue control memory configured to store a plurality of entries corresponding to received indications of congestion at downstream network devices.

15. The device of claim 14, wherein the congestion queue control memory is a content addressable memory.

16. The device of claim 13, further comprising:
   one or more additional primary queues;
   wherein the primary queue and the one or more additional primary queues are configured to store packets corresponding to different traffic classes.

17. The device of claim 13, further comprising:
   one or more additional congestion queues;
   wherein the congestion queue and the one or more additional congestion queues are configured to store packets corresponding to different traffic classes.

18. The device of claim 13, wherein individual packets in the group of one or more packets include packet headers, and wherein individual ones of the packet headers specify one or more outputs of downstream network devices.

19. The device of claim 13, wherein the device is configured to:
   determine that congestion at the particular output port of the downstream network device is alleviated; and
   in response to said determining that the congestion is alleviated, transmit the group of one or more packets stored in the congestion queue to the downstream network device.

20. The device of claim 19, wherein said determining that the congestion is alleviated includes receiving a communication from the downstream network device subsequent to receiving the indication of congestion.

* * * * *

UNITED STATES PATENT AND TRADEMARK OFFICE
CERTIFICATE OF CORRECTION

PATENT NO. : 8,531,968 B2  
APPLICATION NO. : 12/872795  
DATED : September 10, 2013  
INVENTOR(S) : Mayhew et al.

Page 1 of 1

It is certified that error appears in the above-identified patent and that said Letters Patent is hereby corrected as shown below:

On the title page, item (75), under "Inventors", in Column 1, Line 1,
delete "Northborogh, MA" and insert -- Northborough, MA --, therefor.

In the Specification

In Column 2, Line 13, delete "output port is" and insert -- output port 3 is --, therefor.

In Column 4, Line 1, delete "FIG. 5 illustrated" and insert -- FIG. 5 illustrates --, therefor.

In Column 4, Line 23, delete "30 and are" and insert -- 30 and 40 are --, therefor.

In Column 5, Line 24, delete "string 344," and insert -- string, --, therefor.

In Column 5, Line 60, delete "switch would" and insert -- switch 20 would --, therefor.

In Column 9, Line 35, delete "classes" and insert -- classes. --, therefor.

Signed and Sealed this
Eighth Day of April, 2014

Michelle K. Lee
*Deputy Director of the United States Patent and Trademark Office*